United States Patent
McCoy

(10) Patent No.: US 6,663,537 B2
(45) Date of Patent: Dec. 16, 2003

(54) EXERCISE MAT

(75) Inventor: Debra L. McCoy, Thornton, CO (US)

(73) Assignee: Matstep Ltd., LLP, Westminster, CO (US)

( * ) Notice: Subject to any disclaimer, the term of this patent is extended or adjusted under 35 U.S.C. 154(b) by 210 days.

(21) Appl. No.: 10/000,463

(22) Filed: Nov. 30, 2001

(65) Prior Publication Data

US 2003/0104910 A1 Jun. 5, 2003

(51) Int. Cl.$^7$ ............................................... A63B 26/00
(52) U.S. Cl. ........................ 482/23; 482/142; 482/148; 482/14; 5/417
(58) Field of Search ............................ 482/142, 23–27, 482/35, 37, 38, 14, 15, 148, 907; 463/36, 47, 38, 37, 46; 4/581; 5/417; D6/582, 613; 15/215; 52/660; D32/57; 248/346.11; D12/203

(56) References Cited

U.S. PATENT DOCUMENTS

| | | | | |
|---|---|---|---|---|
| 4,336,293 A | * | 6/1982 | Eiden | 428/143 |
| 4,596,729 A | * | 6/1986 | Morrison | 428/44 |
| 4,762,741 A | * | 8/1988 | Hedley | 428/78 |
| 5,997,995 A | * | 12/1999 | Scianna | 428/195 |
| 6,450,886 B1 | * | 9/2002 | Oishi et al. | 463/36 |

* cited by examiner

Primary Examiner—Nicholas D. Lucchesi
Assistant Examiner—L Amerson
(74) Attorney, Agent, or Firm—Dorsey & Whitney LLP

(57) ABSTRACT

A non-slip exercise mat for use on multiple surfaces including at least one layer of material having a top surface, a bottom surface, and side surfaces. The mat also includes systems for removably securing the mat to carpeted surfaces and for preventing the mat from slipping on non-carpeted surfaces. Both systems can be joined with the bottom surface or joined on opposite surfaces of the mat. The mat may include shock absorbing materials as well as texturized, slip-resistant materials. The sides of the mat may be beveled. The mat may also include a cover for the system for removably securing the mat to carpeted surfaces.

29 Claims, 5 Drawing Sheets

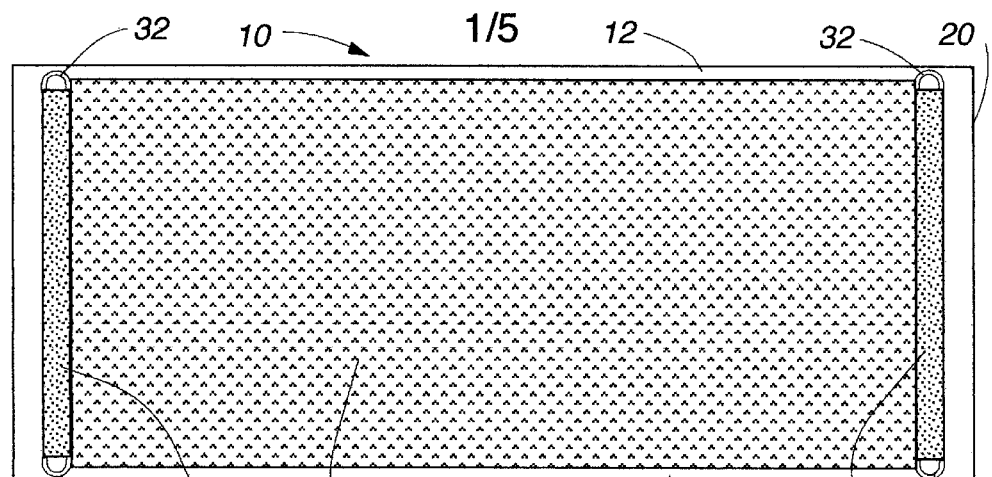
Fig. 1
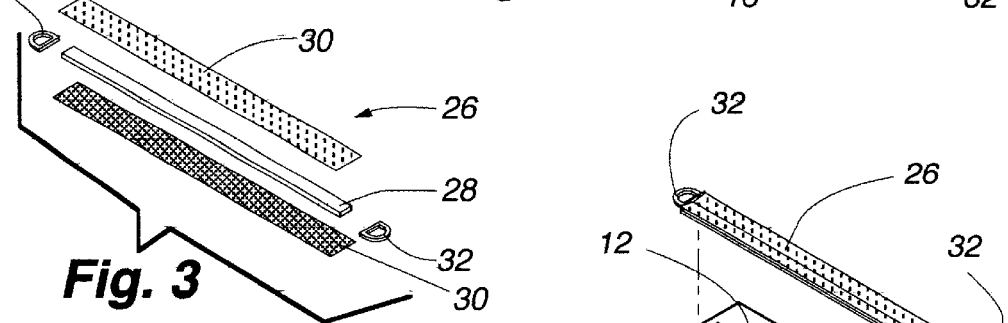
Fig. 3
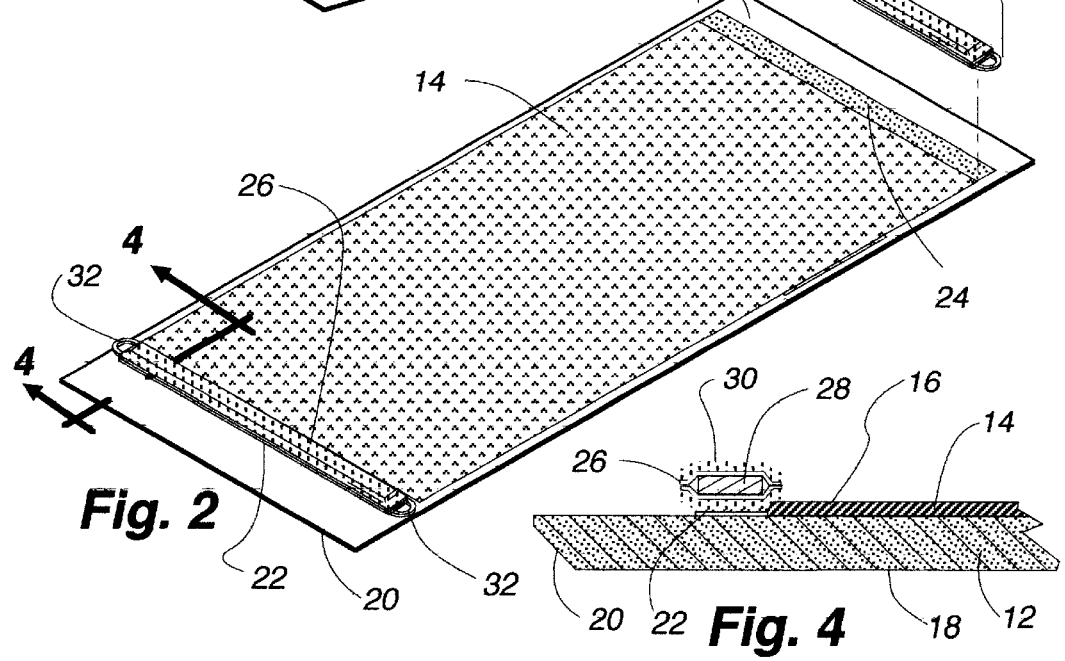
Fig. 2
Fig. 4

EXERCISE MAT

FIELD OF THE INVENTION

This invention relates to an exercise mat for use on multiple surfaces, and more specifically, to an exercise mat that includes means for removably adhering the mat to both carpeted surfaces and non-carpeted surfaces.

BACKGROUND OF THE INVENTION

Step aerobics are a popular form of exercise in exercise clubs around the world. Typically, a plastic bench-type step is utilized in step aerobic classes. During step aerobics, a participant performs a series of choreographed dance-like routines that involve stepping on and off of the bench-type step. The bench-type step is typically adjustable from a few inches to over a foot in height. In addition to an aerobic workout, the user also exercises his or her leg muscles during the repetitive stepping motions.

Exercise clubs typically include specific rooms designated for aerobics classes. In some cases, the rooms includes non-carpeted surfaces such as hardwood or painted concrete. In other cases, the aerobics room may include a carpeted floor. In still other cases, aerobics classes may be conducted in different rooms having different flooring surfaces on different days or at different times. Typically, aerobic steps include bottom surfaces that only effectively resist slipping on a specific surface. Such steps may at a minimum be a nuisance to use depending on the surface or at worse may pose a safety hazard to the participant thereby rendering the step useless on that surface.

Step aerobics can be very difficult to learn for a variety of reasons. Some users lack sufficient coordination to perform a choreographed routine that involves substantial lateral movement in combination with the vertical movement required during the stepping motions. Some users lack sufficient leg strength to endure repeated stepping motions for the length of an entire aerobics class (typically one hour or longer.) Other users have physical impairments such as pregnancy, leg or knee injuries, or various physical handicaps that render them unable to perform repetitive stepping motions on a bench-type step because of both the height and hardness of the step.

When using a typical elevated or pedestal step, for safety reasons, it is generally recommended that the user only move in a forward motion and that the user not step off of the sides of the step. Such limitations reduce the choreographic design options when developing routines.

During a typical step aerobics class, the choreographed routines are performed to music. Typically, the maximum beats per minute that one can safely exercise to is approximately 130–140 beats per minute. The elevation of the steps typically used make it unsafe for a class participant to use the step at any higher beats per minute. In some cases, a higher beats per minute may be desired depending on the fitness level and fitness goals of the class participants.

Typical aerobics steps can include multiple parts and weigh as much as twenty pounds. The size and weight of such steps makes them inconvenient and impractical to take along on trips. In addition, a typical step cannot be easily stored in a small space such as under a user's bed or in the corner of a closet.

At the end of a typical aerobics class, users are often asked to retrieve a soft exercise mat to perform abdominal exercises. At that time, the users in the class often return their steps to a storage area in the classroom and retrieve separate exercise mats from an adjacent area. The exchange of equipment can often take several minutes thereby utilizing class time in an inefficient manner.

There is a need for a combination exercise mat and step that resists slipping on both carpeted and non-carpeted surfaces. There is a need for a combination exercise mat and step that allows inexperienced step aerobics participants to gradually learn step aerobics by significantly lowering the step height thereby requiring less coordination of the participant. There is a need for a combination exercise mat and step that requires less leg strength and/or balance from the participant due to a lowered step height. There is a need for a combination exercise mat and step that allows for use by participants with physical impairments by having a lower step height and including shock-absorbing materials. There is a need for a combination exercise mat and step that allows a class participant to move in all directions when using the step and allows the user to step off either end of the step. There is a need for a combination exercise mat and step that allows a user to perform aerobics routines with beats per minutes as high as 150–160 without causing undue risk of injury. There is a need for a combination exercise mat and step that is portable, travel convenient, and easy to store. There is a need for a combination exercise mat and step that avoids the need for equipment exchanges during an aerobics class by providing a step that can be utilized both as a step during the step aerobics routine and as an exercise mat during any subsequent abdominal exercises.

The exercise mat of the present invention includes means for resisting slippage on both carpeted and non-carpeted surfaces. The exercise mat includes a lower vertical profile and shock-absorbing materials to more easily allow for use by inexperienced step aerobics participants, participants having lesser leg strength, and participants with physical impairments. The exercise mat allows a participant to safely move in forward and backward directions over the surface of the mat. The exercise mat allows participants to safely step of all sides of the mat without causing the mat to lose stability. The exercise mat allows a user to perform routines with higher beats per minutes without causing an undue risk of injury. The exercise mat can typically be folded or rolled into a very small package that is convenient for travel and easily stored. In addition, the exercise mat can be utilized as either an aerobics step for use during a step aerobics class or as an exercise mat for use during abdominal exercises and other floor exercises.

SUMMARY OF THE INVENTION

The present invention includes a non-slip exercise mat for use on multiple surfaces. In one embodiment, the mat includes at least one layer of material, with the layer having a top surface, a bottom surface, and side surfaces. In one embodiment, the mat also includes a system on the bottom surface for removably securing the mat to carpeted surfaces and a system on the bottom surface for preventing the mat from slipping on non-carpeted surfaces.

In another embodiment of the exercise mat, the layer of material is shock absorbing.

In another embodiment of the exercise mat, the side surfaces are beveled so that the surface area of the top surface is less than the surface area of the bottom surface.

In another embodiment of the exercise mat, the top surface is texturized to minimize slippage on the top surface.

In still another embodiment of the exercise mat, the mat includes a removable cover for the system for removably securing the mat to carpeted surfaces.

In another embodiment of the exercise mat, the removable cover is not integral with the bottom surface.

In another embodiment of the exercise mat, the mat includes a weight system for increasing the overall weight of the mat to further prevent the mat from slipping during use.

In yet another embodiment of the exercise mat, the weight system is are located between the top surface and the bottom surface.

In still another embodiment of the exercise mat, the system for removably securing the mat to carpeted surfaces includes a hook material of the type used in hook and loop type fasteners.

In another embodiment of the exercise mat, the system for removably securing the mat to carpeted surfaces is removable.

BRIEF DESCRIPTION OF THE DRAWINGS

FIG. 1 is a plan view of the bottom of one embodiment of the exercise mat of the present invention.

FIG. 2 is a partially exploded isometric view of the embodiment illustrated in FIG. 1.

FIG. 3 is an exploded view of the anchor bar illustrated in FIG. 2.

FIG. 4 is a side section taken along line 4—4 of FIG. 2.

DETAILED DESCRIPTION OF THE INVENTION

The exercise mat of the present invention is typically used in conjunction with step aerobics classes. During an aerobics class, participants step on and off of the mat during a choreographed routine aimed to exercise the participants aerobically and otherwise. In addition to offering a lower step than the type of steps typically used, the exercise mat of the present invention also has shock absorbing and shock dampening benefits over typical steps. In addition, the exercise mat offers a stable surface for participants on both carpeted and non-carpeted surfaces. The exercise mat includes systems that both removably adhere the mat to carpets and removably adhere the mat to non-carpeted surfaces.

FIGS. 1–4 illustrate one embodiment of the present invention non-slip exercise mat 10. In FIG. 1, a plan view of the bottom 16 of the mat is illustrated. The embodiment illustrated in FIGS. 1–4 includes a top layer 12 joined with a bottom layer 14. The bottom layer 14 is typically slightly smaller in size than the top layer 12. Both layers are typically fabricated using a rubber sponge material. In one embodiment, the bottom layer 14 is fabricated from 1/16 inch thick Decco R-12 felt rubber sponge and the top layer 12 is manufactured from 3/8 inch thick 100% chemically blown polyvinylchloride sponge rubber manufactured by Supermat Inc. In other embodiments, equivalent substitute materials may be used providing they provide substantially the same characteristics as the above specified materials.

The top layer 12 and bottom layer 14 are typically joined with one another using a common acrylic adhesive. However, other means of joining the top layer 12 to the bottom layer 14 could also be used. Examples include but are not limited to plate welding, sewing, other types of adhesives, and various other mechanical means.

Figure 10:
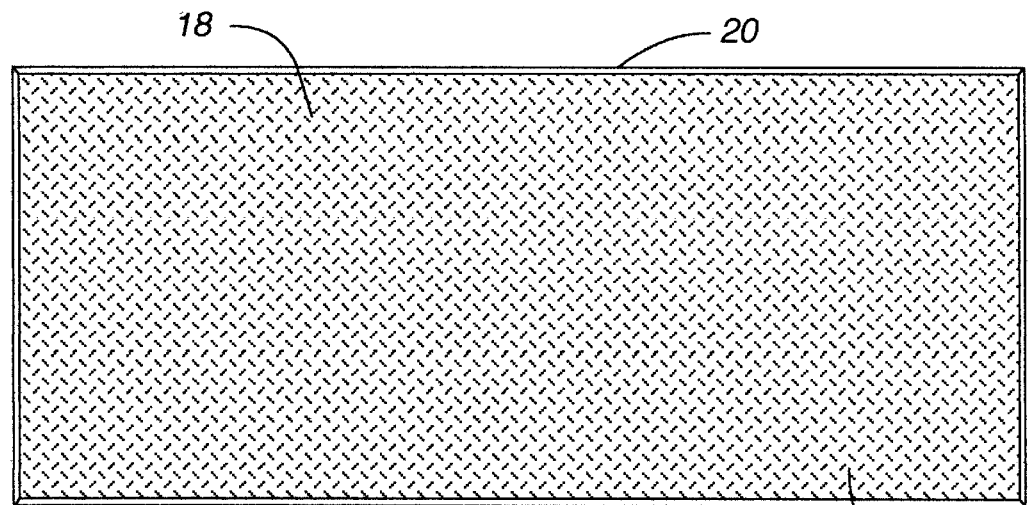
FIG. 10 is a top plan view of one embodiment of the exercise mat.

As better illustrated below in FIG. 10, the top surface 18 of the top layer 12 is typically texturized to provide better traction to a user. In addition, as clearly seen in FIG. 4, the edges 20 of the top surface 18 are generally beveled to provide the user with a smoother transition from the surrounding floor onto the surface of the mat 10.

As mentioned above, the exercise mat 10 includes systems that allow it to both adhere to carpeted surfaces and non-carpeted surfaces. The bottom layer material 14 generally releasably adheres to non-carpeted surfaces. However, the bottom layer material 14 is generally not effective in anchoring the mat to a carpeted surface.

As illustrated in FIGS. 1–4, adjacent each end of the bottom layer 14 is a rectangular-shaped strip of looped-fastener material. The strips 22, 24 of looped-fastener material 22, 24 typically run along the entire width of the bottom layer. Anchor bars 26 including aluminum bars 28 encased in hook-fastener material 30 and having D-rings 32 at both ends are joined with the loop-fastener strips 22, 24 at both ends of the bottom layer 14 to provide the bottom 16 of the mat 10 with a removable layer to adhere to a carpeted surface. Typically, the aluminum bar 28 is 1/8 inch×1/2 inch thick aluminum flat stock. In one embodiment, the loop-fastener strips 22, 24 are fabricated using #1000 loop VELCRO® brand loop-fastener material, and the hook-fastener material utilized is either 1-inch #88 hook VELCRO® brand hook-fastener material or 1-inch MVA #8 hook VELCRO® brand hook-fastener material, or a combination of both. In other embodiments, generic hook and loop-fastener materials may be used. In still other embodiments, other removable fastener materials may be utilized. The D-rings utilized are preferably constructed from plastic materials but may fabricated from metal. In addition, the D-rings are preferably sized to join with the end of the anchor bars.

The mat can basically be used in one of two modes. The first mode involves use on a carpeted surface. FIG. 4 illustrates the mat configured for use on a carpeted surface. In FIG. 4, the hook-fastener encased anchor bars 26 are joined with the loop-fastener material 22, 24 on the bottom of the mat thereby removably adhering the anchor bars 26 to the bottom 16 of the mat. As mentioned above, the anchor bars include an aluminum bar 28 encased in hook-fastener material 30. One side of each anchor bar adheres to the loop-fastener material on the bottom of the mat. The other side of each anchor bar (the side facing away from the bottom of the mat) is typically effective in removably adhering to carpeted surfaces thereby anchoring the mat to the carpeted surface.

In a second mode or when the mat of the present invention is used on non-carpeted surfaces, the user simply removes the anchor bars 26 from the bottom 16 of the mat prior to using the mat. As mentioned above and illustrated in FIGS. 1–3, the ends of the anchor bars 26 typically include D-rings 32. The D-rings 32 generally make it easier for the user to remove the anchor bars 26 from the bottom 16 of the mat by providing an easy to grasp loop on each end of the anchor bars 26.

Additional embodiments of the present invention are illustrated in FIGS. 5–13 and discussed below. Elements identical to the elements included in the embodiment discussed above will be represented by the same element number in the specification and drawings as the above. Elements that are common but not identical to the embodiment discussed above will be represented by the element number used above followed by either a first or second prime.

Figure 5:
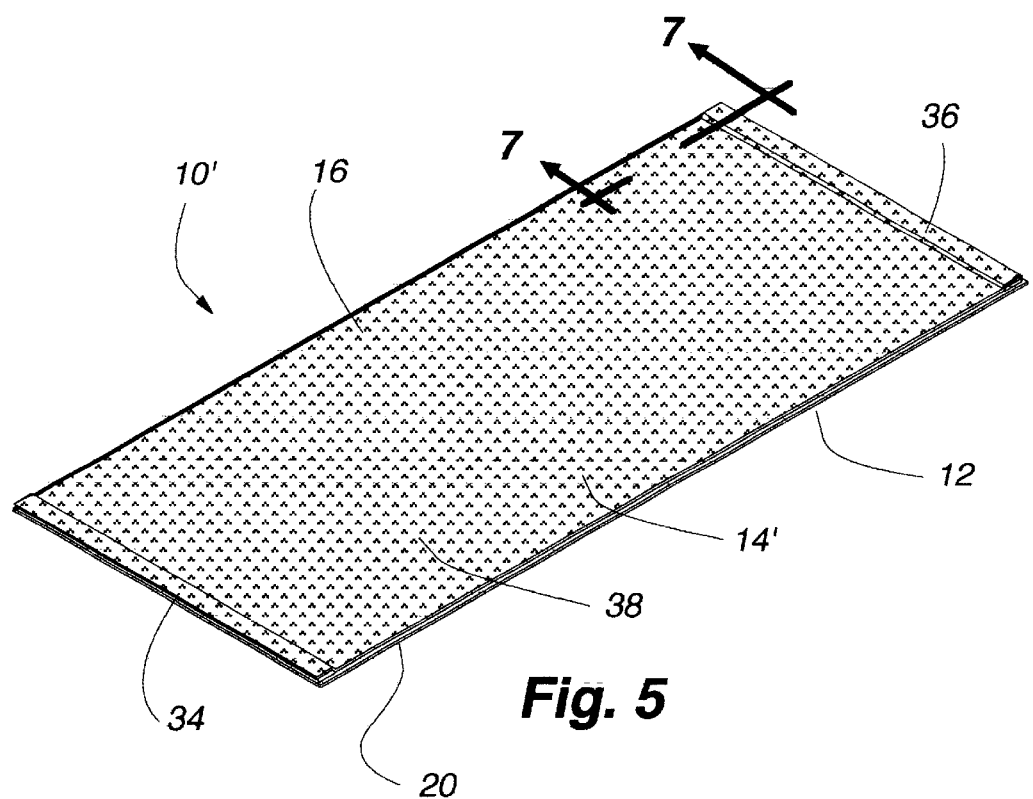
FIG. 5 is an isometric of the bottom surface of one embodiment of the exercise mat of the present invention.
Figure 6:
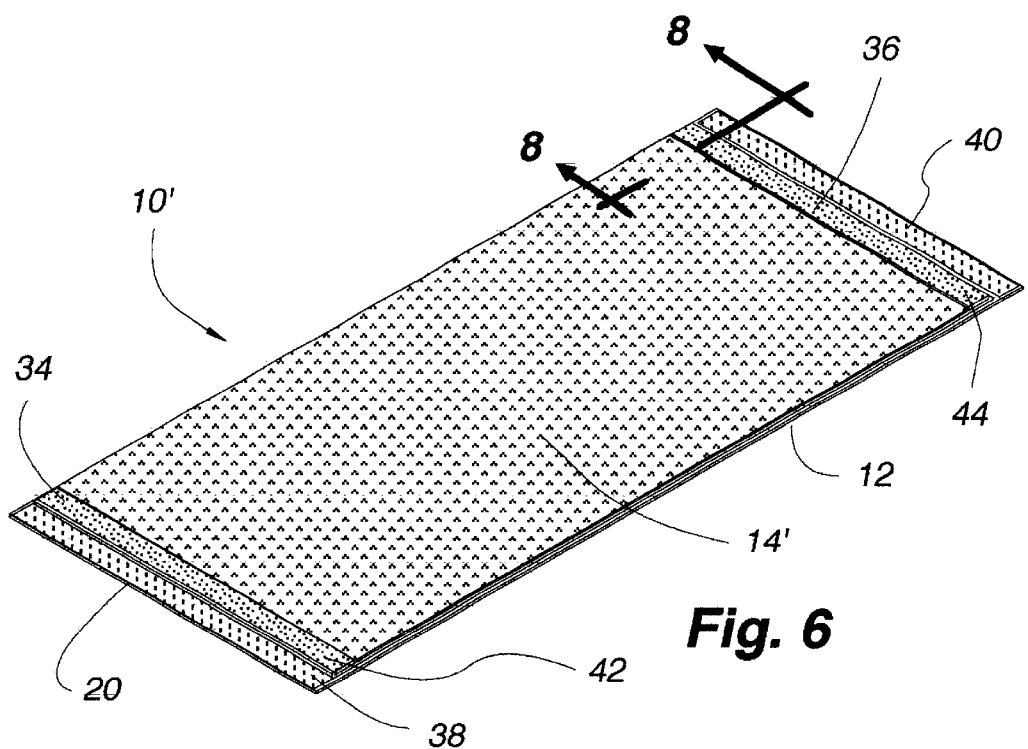
FIG. 6 is an isometric of the bottom surface of the embodiment illustrated in FIG. 5, with the flaps in an open position.

FIGS. 5–9 illustrate another embodiment of the present invention. In this embodiment, the exercise mat also includes a top layer 12 and a bottom layer 14'. As in the embodiment illustrated in FIGS. 1–4, this embodiment illustrated includes a bottom layer 14' that is manufactured from materials that adhere to non-carpeted surfaces. Again, the embodiment illustrated in FIGS. 5–9 also includes means for attaching the exercise mat 10' to a carpeted surface. However, unlike the embodiment illustrated in FIGS. 1–4, the embodiment in FIGS. 5–9 includes foldable flaps 34, 36 formed in the bottom layer 14' of the exercise mat 10' at each end of the bottom layer 14'. Also, the bottom layer 14' in the embodiment illustrated in FIGS. 5–9 is substantially the same size as the top layer 12. As illustrated in FIG. 6, the foldable flaps 34, 36 can be folded inwardly toward the center 38 of the exercise mat 10' to expose strips of hook-fastener material 38, 40. The hook-fastener material strips 38, 40 are joined with the bottom surface 16 of the top layer 12 of the exercise mat 10'. The undersides 42, 44 of the foldable flaps 34, 36, which are exposed in FIG. 6, can include loop-fastener material, hook-fastener material, or a combination of both. The hook-fastener material on the bottom surface of the top layer is generally effective at anchoring the exercise mat to a carpeted surface.

As with the embodiment illustrated in FIGS. 1–4, the embodiment illustrated in FIGS. 5–9 also includes two modes of use. The first mode involves using the mat on a non-carpeted surface. FIG. 5 illustrates the exercise mat configured to be used on a non-carpeted surface. In FIG. 5, the foldable flaps 34, 36 on the bottom layer 14' of the exercise mat are not folded or are in a closed position. The flaps 34, 36 in FIG. 5 operate to cover the hook-fastener material 38, 40 underneath. The hook-fastener material 38, 40 underneath may be abrasive enough to scratch a non-carpeted surface. Therefore, it is preferred that some means, such foldable flaps 34, 36 are used to cover the hook-fastener material 38, 40 when the exercise mat is used on a non-carpeted surface. The bottom layer 14' is fabricated from the same or similar non-slip rubber sponge material as used in the embodiment illustrated in FIGS. 1–4 and is effective in preventing the exercise mat from slipping on non-carpeted surfaces.

In FIG. 6, the exercise mat is configured to be used on a carpeted surface. In FIG. 6, the foldable flaps 34, 36 are folded or are in an open position. When the foldable flaps 34, 36 are in an open position, the hook-fastener material 38, 40 underneath is exposed. The hook-fastener material 38, 40 effectively anchors the exercise mat to a carpeted surface.

Figure 7:
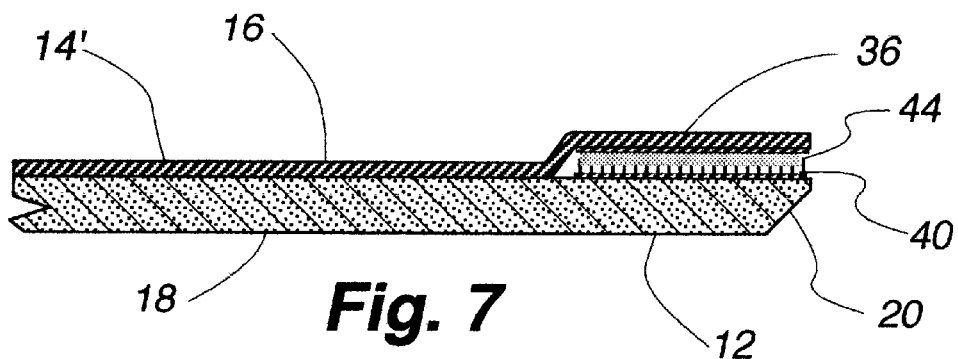
FIG. 7 is a side section taken along line 7—7 of FIG. 5.
Figure 8:
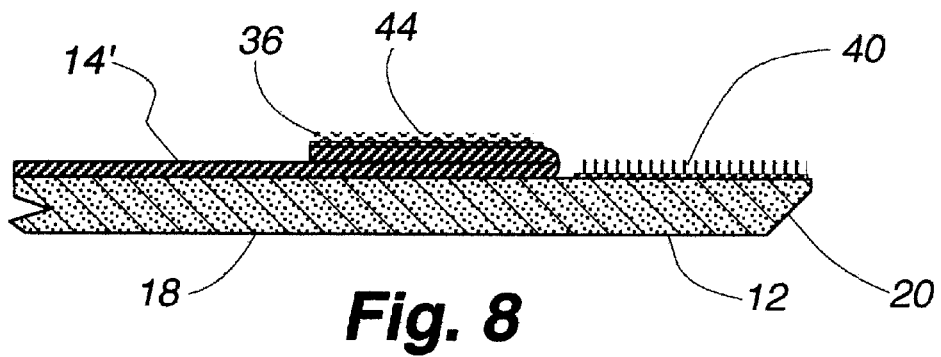
FIG. 8 is a side section taken along line 8—8 of FIG. 6.

FIGS. 7–8 represents side sectional views of the embodiment illustrated in FIGS. 5–6. In FIG. 7, the foldable flaps 34, 36 are in a closed position. As clearly shown in FIG. 7, when in a closed position, foldable flap 36 effectively covers the hook-fastener material 40. When the flaps are in a closed position, the entire bottom surface 16 of the exercise mat 10' is effectively formed from the bottom layer rubber sponge material and is therefore effective at preventing the exercise mat from slipping on a non-carpeted surface.

In FIG. 8, the foldable flaps 34, 36 are folded back to expose the underlying hook-fastener material 38, 40. The underlying hook-fastener material is joined with the bottom surface 16 of the top layer 12 using adhesive means described above in the embodiment illustrated in FIGS. 1–4. In the FIG. 8 embodiment, the underside 44 of the foldable flap includes a loop-fastener material. The loop-fastener material generally keeps the flaps in a closed position by joining the undersides of the flaps to the underlying hook-fastener material. In other embodiments, the undersides of the flaps may include hook-fastener material or a combination of both hook and loop-fastener materials. Hook-fastener material is generally effective at removably connecting with carpeted surfaces. In the FIG. 8 embodiment, the strip of hook-fastener material will effectively anchor the exercise mat to a carpeted surface.

Figure 9:
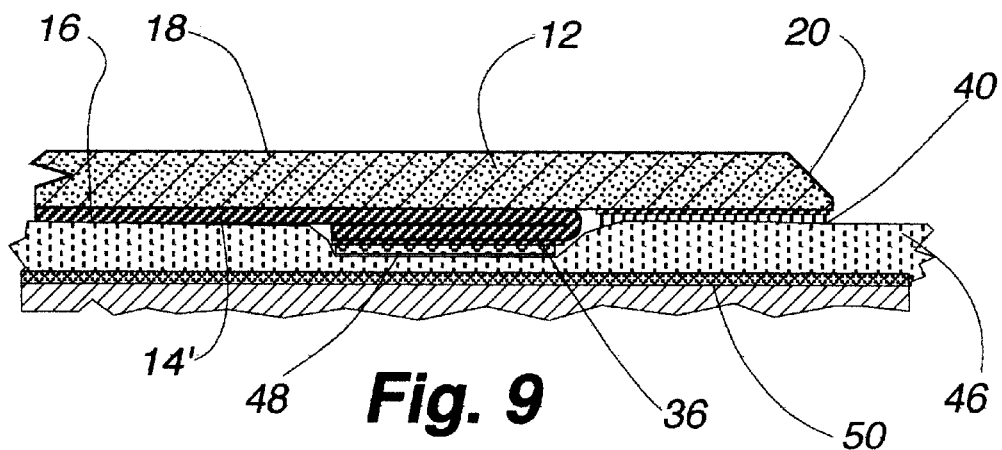
FIG. 9 is a side section of the embodiment illustrated in FIGS. 5–6 with the mat configured to have flaps in an open position for use on a carpeted surface.

In FIG. 9 the exercise mat illustrated in FIGS. 5–8 is configured to be used with a carpeted surface. The exercise mat 10' is shown right side 18 up with the foldable flap 36 folded over to expose the hook-fastener material 40 underneath. The hook-fastener material 40 is joined with the carpeted flooring 46 underneath and the foldable flap 36 is shown being pushed downwardly into the surface 48 of the carpet 46 thereby allowing the top 18 of the exercise mat 10' to have a generally flat surface substantially parallel to the underlying floor 50.

FIGS. 10–13 illustrate another embodiment of the exercise mat. As with the embodiments illustrated above, the embodiment illustrated in FIGS. 10"-13 generally includes the same materials of construction as the previous embodiments. The embodiment illustrated in FIGS. 10–13 differs from the previous embodiments in that it generally includes only one primary layer 12 of material. The primary layer 12 of material utilized is typically identical to the top layer 12 utilized in the embodiments described above. However, rather than including an entire second layer, the embodiment illustrated in FIGS. 10–13 includes only strips of additional material joined with the bottom surface 16 of the single layer 12.

Figure 11:
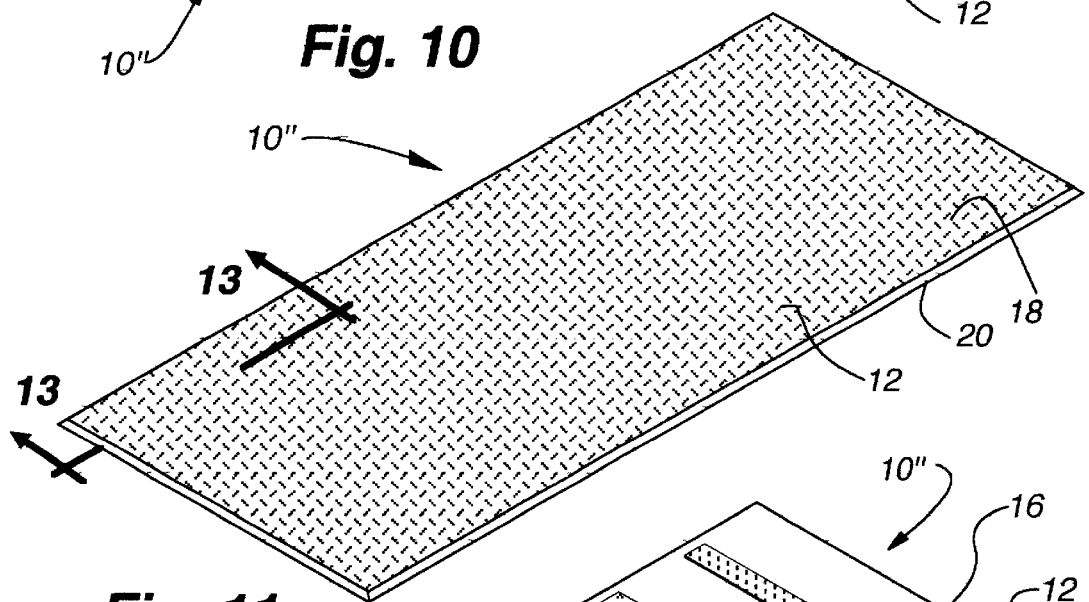
FIG. 11 is an isometric of the embodiment illustrated in FIG. 10.
Figure 12:
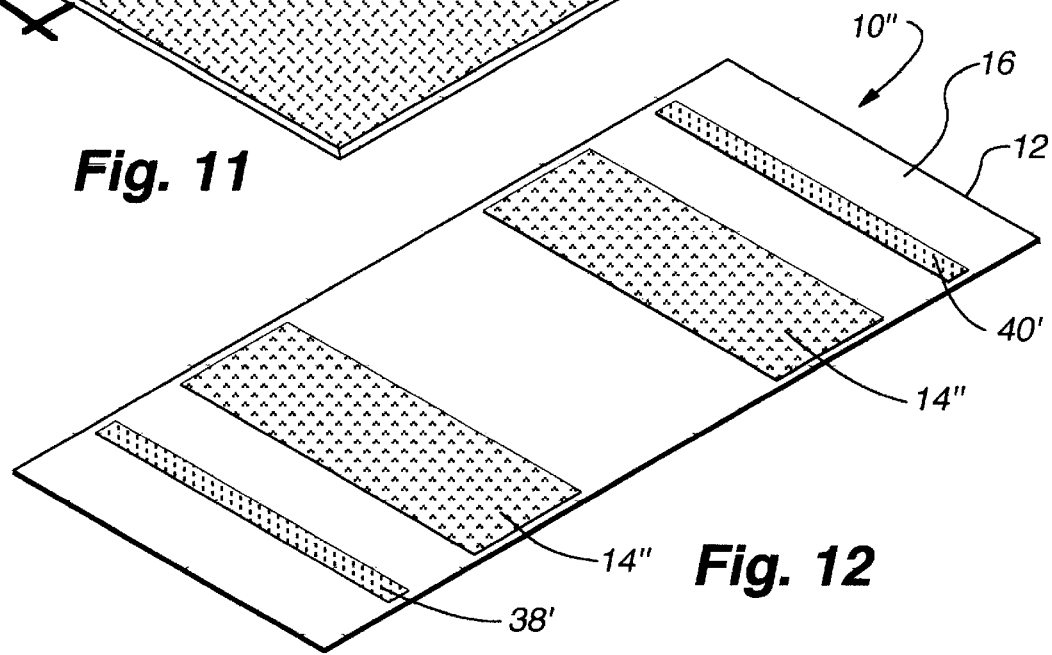
FIG. 12 is an isometric showing the bottom surface of the embodiment illustrated in FIG. 10.

As illustrated in FIG. 12, two strips of hook-fastener material 38', 40' and two strips of sponge rubber material 14" are joined with the bottom surface 16 of the single layer mat 10". As with the embodiments above, the hook-fastener materials 38', 40' are typically effective at anchoring the exercise mat to a carpeted surface. The sponge-rubber material 14" is typically effective at anchoring the exercise mat to a non-carpeted surface. In the embodiment illustrated in FIGS. 10–13, the mat can be used on either carpeted or non-carpeted surfaces without any adjustments to the bottom of the mat. To prevent any damage to any underlying non-carpeted surfaces from coming in contact with potentially abrasive hook-fastener materials, in the embodiment illustrated in FIGS. 10–13 it is preferred that a substantially non-abrasive hook-fastener material be utilized.

Figure 13:
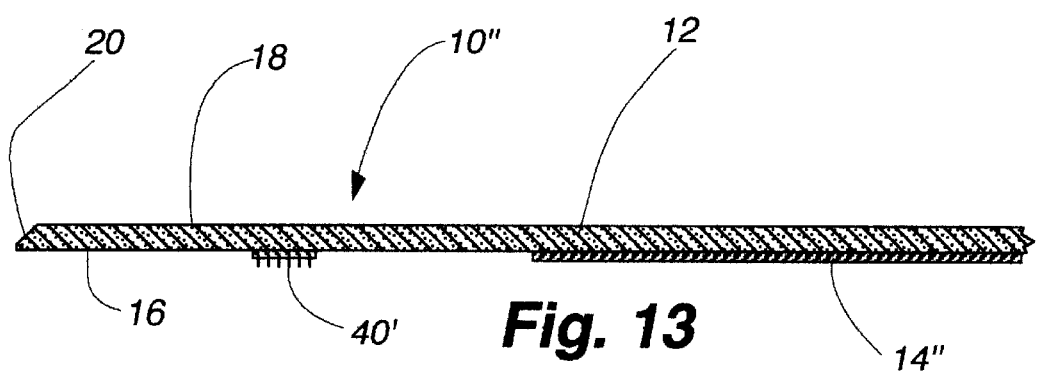
FIG. 13 is a side section taken along line 13—13 of FIG. 11.

FIG. 13 illustrates a side sectional view taken along line 13—13 of FIG. 11. As can be seen in FIG. 13, both the strip of hook-fastener material 40' and the strip of sponge-rubber material 14" are joined with the bottom surface 16 of the mat layer 12. In the FIG. 13 configuration, both materials 40', 14" are joined with the bottom surface 16 of the mat and will contact the underlying floor 50 when the mat 10" is in use.

In another embodiment of the exercise mat, multiple anchor bars may be used. Because the anchor bars add additional weight to the exercise mat, they are also helpful in preventing the mat from slipping. With the additional anchor bars extending across the width of the mat, the mat can be rolled-up when not in use.

In another embodiment of the present invention, weight bars such as the aluminum bars may be included between the various mat layers to further increase the overall weight of the mat. A higher overall weight may be desired to help prevent the mat from slipping. Again, if additional weight is added internal to the mat layers, it is preferred that the additional weight be configured so that the mat can still be rolled-up when not in use.

In another embodiment of the present invention, multiple mats may be configured to be stacked on top of one another. A basic clip may be utilized to clip multiple mats to one another. Alternatively, each mat may include several holes along its perimeter. A screw-like connection could be threaded through the holes in multiple mats to join the mats to one another during use. Other means, such as hook and loop-fastener material, may be utilized to removably adhere multiple mats to one another. Many types of connectors or fasteners would be acceptable for joining multiple mats to one another providing the joined mats offer sufficient stability to the user during use.

In another embodiment of the present invention, the systems for adhering the mat to both a carpeted surface and a non-carpeted surface may be located on opposite surfaces of the mat. For example, one side of the mat might includes a border formed from hook-fastener material and the opposite side of the mat might include a border formed from rubber sponge material that removably adheres to non-carpeted surfaces. Such an embodiment would allow the user to use the mat on both carpeted and non-carpeted surfaces by simply placing the appropriate side of the mat in contact with the respective support surface.

Specific materials of construction are discussed above with respect to the various embodiments. However, substitute materials of construction are acceptable providing they offer substantially similar characteristics to the above materials specified. For example, other materials that removably adhere to carpeted surfaces or other materials that removably adhere to non-carpeted surfaces may be utilized in place of the materials discussed above.

The specific dimensions of the exercise mat were not delineated above. However, in one embodiment, the mat footprint is approximately 36" long by 16" wide. The specific dimensions of the exercise mat may be altered depending on the specific use of the mat. In addition, in other embodiments of the present invention, the mat may include but is not limited to different shaped designs such as square, rectangular, and circular.

Although the present invention has been described with a certain degree of particularity, it is understood that the present disclosure has been made by way of example, and changes in detail or structure may be made without departing from the spirit of the invention as defined in the appended claims.

What is claimed is:

1. A non-slip exercise mat for use on multiple surfaces, said mat comprising:
   at least one layer of material, said layer having a top surface, a bottom surface, and side surfaces;
   means for removably securing said mat to carpeted surfaces, said means joined with said bottom surface; and
   means for preventing said mat from slipping on non-carpeted surfaces, said means joined with said bottom surface.

2. The mat in claim 1, wherein:
said at least one layer of material is shock absorbing.

3. The mat in claim 1, wherein:
said side surfaces are beveled so that the surface area of said top surface is less than the surface area of said bottom surface.

4. The mat in claim 1, wherein:
said top surface is texturized to minimize slippage on said top surface.

5. The mat in claim 1, further comprising:
means for removably covering said means for removably securing said mat to carpeted surfaces.

6. The mat in claim 5, wherein:
said means for removably covering are not integral to said bottom surface.

7. The mat in claim 1, further comprising:
weight means for increasing the overall weight of said mat to further prevent said mat from slipping during use.

8. The mat in claim 7, wherein:
said weight means are located between said top surface and said bottom surface.

9. The mat in claim 1, wherein:
said means for removably securing said mat to carpeted surfaces includes a hook and loop type fastener material.

10. A non-slip exercise mat for use on multiple surfaces, said mat comprising:
    at least one layer of material, said layer having a top surface, a bottom surface, and side surfaces;
    means for removably securing said mat to carpeted surfaces, said means joined with said bottom surface;
    means for preventing said mat from slipping on non-carpeted surfaces, said means joined with said bottom surface; and
    means for removably covering said means for removably securing said mat to carpeted surfaces.

11. The mat in claim 10, wherein:
said at least one layer of material is shock absorbing.

12. The mat in claim 10, wherein:
said side surfaces are beveled so that the surface area of said top surface is less than the surface area of said bottom surface.

13. The mat in claim 10, wherein:
said top surface is texturized to minimize slippage on said top surface.

14. The mat in claim 10, wherein:
said means for removably covering are not integral to said bottom surface.

15. The mat in claim 10, further comprising:
weight means for increasing the overall weight of said mat to further prevent said mat from slipping during use.

16. The mat in claim 15, wherein:
said weight means are located between said top surface and said bottom surface.

17. The mat step in claim 10, wherein:
said means for removably securing said mat to carpeted surfaces includes a hook and loop type fastener material.

18. A non-slip exercise mat for use on multiple surfaces, said mat comprising:
  a top layer of material, said top layer including a top surface, a bottom surface, and side surfaces;
  a bottom layer of material, said bottom layer including a top surface, a bottom surface, and side surfaces, said top surface of said bottom layer being joined with said bottom surface of said top layer;
  means for removably securing said mat to carpeted surfaces, said means joined with said bottom surface of said top layer;
  means for preventing said mat from slipping on non-carpeted surfaces, said means integral to said bottom surface of said bottom layer; and
  means for removably covering said means for removably securing said mat to carpeted surfaces, said means integral to said bottom layer.

19. The mat in claim 18, wherein:
  said means for removably covering said means for removably securing said mat to carpeted surfaces includes foldable flaps integral to said bottom layer.

20. The mat in claim 7, wherein:
  said weight means are removably joined with said bottom surface.

21. The mat in claim 15, wherein:
  said weight means are removably joined with said bottom surface.

22. The mat in claim 1, wherein:
  said means for preventing said mat from slipping on non-carpeted surfaces includes a sponge rubber material.

23. The mat in claim 10, wherein:
  said means for preventing said mat from slipping on non-carpeted surfaces includes a sponge rubber material.

24. The mat in claim 18, wherein:
  said means for preventing said mat from slipping on non-carpeted surfaces includes a sponge rubber material.

25. A non-slip exercise mat for use on multiple surfaces, said mat comprising:
  at least one layer of material, said layer having a top surface, a bottom surface, and side surfaces;
  means for removably securing said mat to carpeted surfaces; and
  means for preventing said mat from slipping on non-carpeted surfaces.

26. A non-slip exercise mat for use on multiple surfaces, said mat comprising:
  at least one layer of material, said layer having a first surface, a second surface, and side surfaces;
  means for removably securing said mat to carpeted surfaces, said means joined with said first surface; and
  means for preventing said mat from slipping on non-carpeted surfaces, said means joined with said second surface.

27. The mat in claim 1, wherein:
  said means for removably securing said mat to carpeted surfaces are removable.

28. The mat in claim 10, wherein:
  said means for removably securing said mat to carpeted surfaces are removable.

29. The mat in claim 18, wherein:
  said means for removably securing said mat to carpeted surfaces are removable.

* * * * *